(12) United States Patent
Coleman et al.

(10) Patent No.: US 11,173,636 B2
(45) Date of Patent: Nov. 16, 2021

(54) MOLDED SKIFF AND DRAIN

(71) Applicant: H.I. Boat Works, Steamboat Springs, CO (US)

(72) Inventors: C. Ray Coleman, Sandy, UT (US); John St. John, Steamboat Springs, CO (US)

(73) Assignee: H.I. BOAT WORKS, Steamboat Springs, CO (US)

( * ) Notice: Subject to any disclaimer, the term of this patent is extended or adjusted under 35 U.S.C. 154(b) by 0 days.

(21) Appl. No.: 16/895,629

(22) Filed: Jun. 8, 2020

(65) Prior Publication Data
US 2020/0298453 A1 Sep. 24, 2020

Related U.S. Application Data

(63) Continuation of application No. 29/592,838, filed on Feb. 2, 2017, now Pat. No. Des. 886,706, which is a
(Continued)

(51) Int. Cl.
*B63B 5/24* (2006.01)
*B29C 41/20* (2006.01)
(Continued)

(52) U.S. Cl.
CPC .............. *B29C 41/20* (2013.01); *B29C 39/18* (2013.01); *B63B 5/24* (2013.01); *B29C 41/04* (2013.01);
(Continued)

(58) Field of Classification Search
CPC ......... B63B 13/00; B63B 13/02; B63B 34/20; B63B 73/72; B29L 2031/3067; B29K 2627/18
See application file for complete search history.

(56) References Cited

U.S. PATENT DOCUMENTS 3,039,641 A 6/1962 Rosan
3,081,493 A 3/1963 Knut et al.
(Continued)

FOREIGN PATENT DOCUMENTS

EP 411214 A * 7/1989 ............. B29C 41/00
EP 0411214 A1 2/1991
(Continued)

OTHER PUBLICATIONS

Final Office Action for U.S. Appl. No. 13/987,318 dated Aug. 3, 2016, 10 pages.
(Continued)

*Primary Examiner* — Andrew Polay
(74) *Attorney, Agent, or Firm* — Workman Nydegger

(57) ABSTRACT

A molded boat with a seat drain. The boat includes a molded hull having been molded using a first material to cause the boat to have a front portion and a rear portion. The boat is molded with a bench, having been molded together with the hull using the first material. The bench includes a drain hole formed through, an otherwise solid face of the bench allowing water to flow from the front portion of the boat to the rear portion of the boat, wherein the drain hole formed through the bench is formed by using a tube molded into, and under the bench, the tube comprising a material having a higher melting point than the first material.

19 Claims, 8 Drawing Sheets

Related U.S. Application Data continuation of application No. 13/987,318, filed on Nov. 6, 2012, now abandoned.

(51) Int. Cl.

| | | |
|---|---|---|
| *B29C 39/18* | (2006.01) | |
| *B29C 41/04* | (2006.01) | |
| *B29L 31/30* | (2006.01) | |
| *B29K 627/18* | (2006.01) | |
| *B63B 73/72* | (2020.01) | |

(52) U.S. Cl.
CPC ... *B29K 2627/18* (2013.01); *B29L 2031/3067* (2013.01); *B63B 73/72* (2020.01)

(56) References Cited

U.S. PATENT DOCUMENTS

| | | |
|---|---|---|
| 3,289,625 A | 12/1966 | Grubb |
| D273,056 S | 3/1984 | Lennon |
| 4,709,648 A | 12/1987 | Andrews |
| 4,766,838 A | 8/1988 | Grady |
| 5,154,134 A | 10/1992 | Goldsmith |
| 5,176,097 A | 1/1993 | Bonin et al. |
| 5,316,810 A * | 5/1994 | Rogerson .............. B29C 70/683 428/167 |
| 5,385,108 A | 1/1995 | Thompson |
| 5,408,949 A | 4/1995 | Deputy |
| 5,756,034 A | 5/1998 | Newton et al. |
| 5,799,605 A | 9/1998 | Huse |
| 6,024,042 A | 2/2000 | Eilert |
| 7,021,234 B1 * | 4/2006 | Belyeu ...................... B63B 3/08 114/347 |
| D794,537 S | 8/2017 | Wagnon |
| D886,706 S | 6/2020 | Coleman et al. |
| 2006/0254495 A1 | 11/2006 | Thomas |
| 2009/0031938 A1 | 2/2009 | Nagler et al. |
| 2013/0228118 A1 | 9/2013 | Zaher |
| 2014/0216327 A1 | 8/2014 | Kate |
| 2014/0299219 A1 | 10/2014 | Coleman et al. |
| 2017/0320545 A1 | 11/2017 | Daley et al. |
| 2018/0334222 A1 | 11/2018 | Daley et al. |

FOREIGN PATENT DOCUMENTS

| | | |
|---|---|---|
| GB | 2089274 A | 6/1982 |
| GB | 2222548 A | 3/1990 |
| JP | 06-238686 A | 8/1994 |

OTHER PUBLICATIONS

Machine Translation of JP 06238686 A, Aug. 1994.
Non-Final Office Action for U.S. Appl. No. 13/987,318 dated Nov. 30, 2015, 10 pages.

* cited by examiner

MOLDED SKIFF AND DRAIN

CROSS-REFERENCE TO RELATED APPLICATIONS

This application claims the benefit of U.S. Design application Ser. No. 29/592,838, now U.S. Design Pat. D886706, which will issue on Jun. 9, 2020, titled "BOAT SEAT WITH HOLE AND CHANNEL" which is a continuation of U.S. Utility application Ser. No. 13/987,318 filed Nov. 6, 2012, titled "ROTO MOLDED SKIFF AND DRAIN", which are incorporated herein by reference in their entireties.

BACKGROUND

Background and Relevant Art

Blow molding and rotational molding have been used to create various types of products. For boats there is often a desire to have structural support of between deck portions of the boat and hull portions of the boat. This can be done by using a structure known as "skin-foam-skin" where one skin is the hull and the second skin is the deck. Foam is injected between the two skins to provide structural support for the deck, allowing a boater to walk on, or otherwise put weight on the deck without the deck deforming too severely or being damaged. However, adding structural foam adds significant weight to the boat.

Boats also often have drain structures that pass through the hull of the boat to allow water to drain from the boats. However, when a boat is blow molded or rotationally molded, temperature changes in the molding process, as well as temperature changes when the boat is in use may cause separation between skin elements of the boat. When this skin separation occurs at a drain location, water may leak into the boat structure between skin elements instead of being drained out of the boat.

Additionally, in general blow molding and rotational molding applications, through holes are limited to thicknesses through the material of about less than one inch. Any longer than this and the through holes distort in undesirable ways during the blow molding process.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments may include a rotomolded boat having a bench with a through hole.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments described herein may implement methods of molding partial or through holes into blow molded articles of manufacture. Embodiments are particularly useful when performing blow molding or so-called roto molding whereby the molding takes place in an oven that include provisions for rotating the article of manufacture while the articles of manufacture are being molded and cured. This may be done, for example, to provision drains, inlet valves, output valves, or for other reasons where holes may need to be formed in and/or through blow molded plastic materials. Such embodiments may mold a tube of a high melting point plastic, such as Polytetrafluoroethylene (PTFE), commonly sold under the trade name Teflon® by DuPont, into and/or through the wall of the rotationally or blow molded article of manufacture. The tube can then be used as a passageway through the wall of the rotationally or blow molded article of manufacture.

Previous processes have been limited to molding holes and through holes that are limited to about less than one inch into or through the wall of the rotationally or blow molded article of manufacture. Holes longer than this tend to melt and deform in undesirable ways. Previously, such holes were formed, in some instances, by pulling a heated metal tube or rod through the plastic walls of the article of manufacture. However, this technique does not work well on walls being more than about 1 inch thick for the reasons stated above.

Using a plastic tube with a high melting point, longer holes and through holes can be realized in rotationally or blow molded articles of manufacture. For example, holes can be formed in rotationally or blow molded articles of manufacture that are greater than one inch in length. That is, holes can be formed partially or completely through rotationally or blow molded articles of manufacture that have walls or members that are greater than one inch thick. In some embodiments, holes may be formed that are greater than two inches. Using the above process, holes may be formed that are about 25 feet or less, but greater than 2 inches. This would allow for holes to be made in some of the largest roto molding ovens in the United States and the world.

Some embodiments may allow for tubes to be used for holes to be molded that are about 20 feet long so as to allow for molding passageways into tanks and other large items. Some embodiments may allow for using tubes in the range of about 6 to 10 feet for creating passageways in molded materials. Some such holes may be used for liquid or air movement, passageways for running wiring or cabling, or for other purposes.

Figure 1:
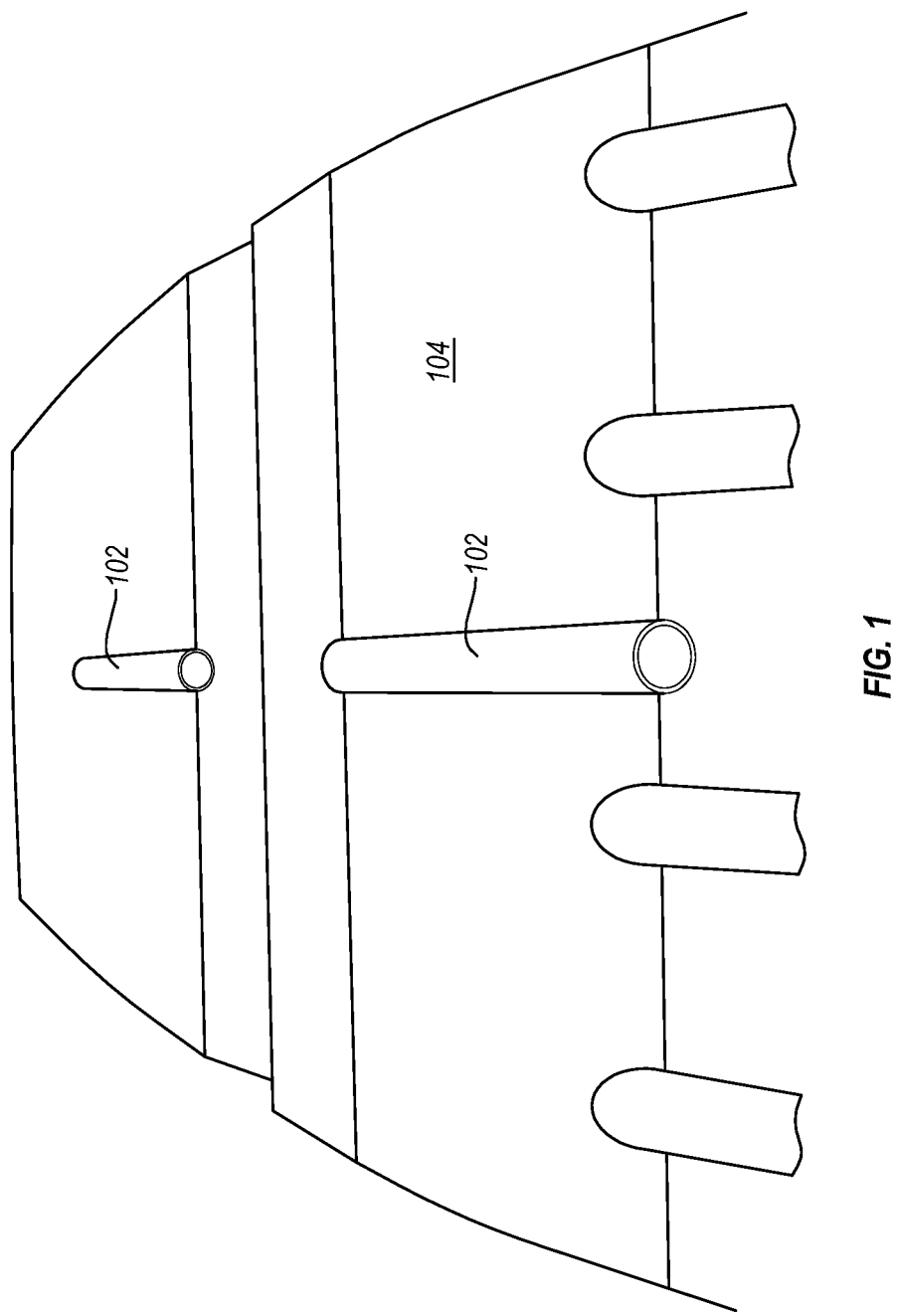
FIG. 1 illustrates a mold for molding a skiff boat.
Figure 2A:
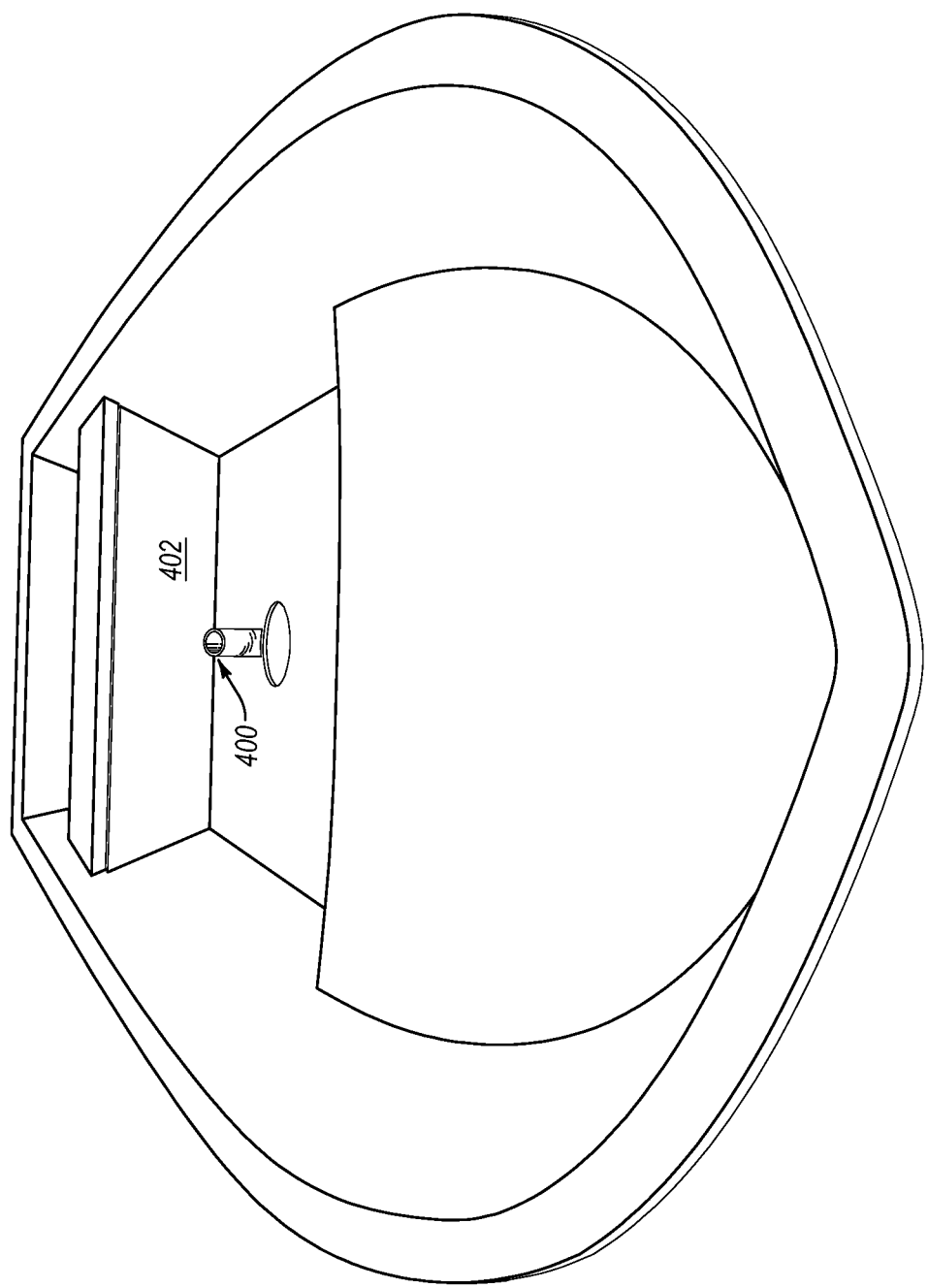
FIG. 2A-2C illustrate various details of the boat of FIG. 1.
Figure 2B:
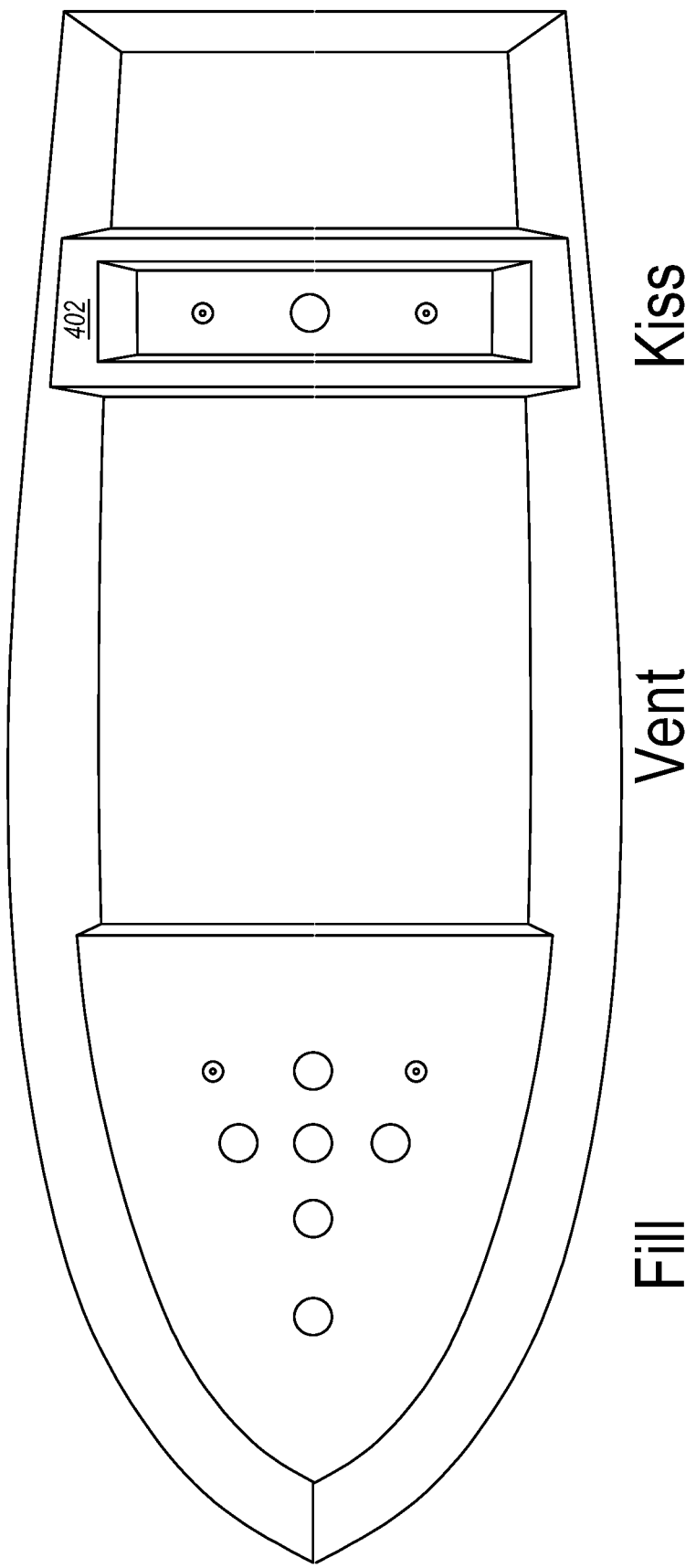
Figure 2C:
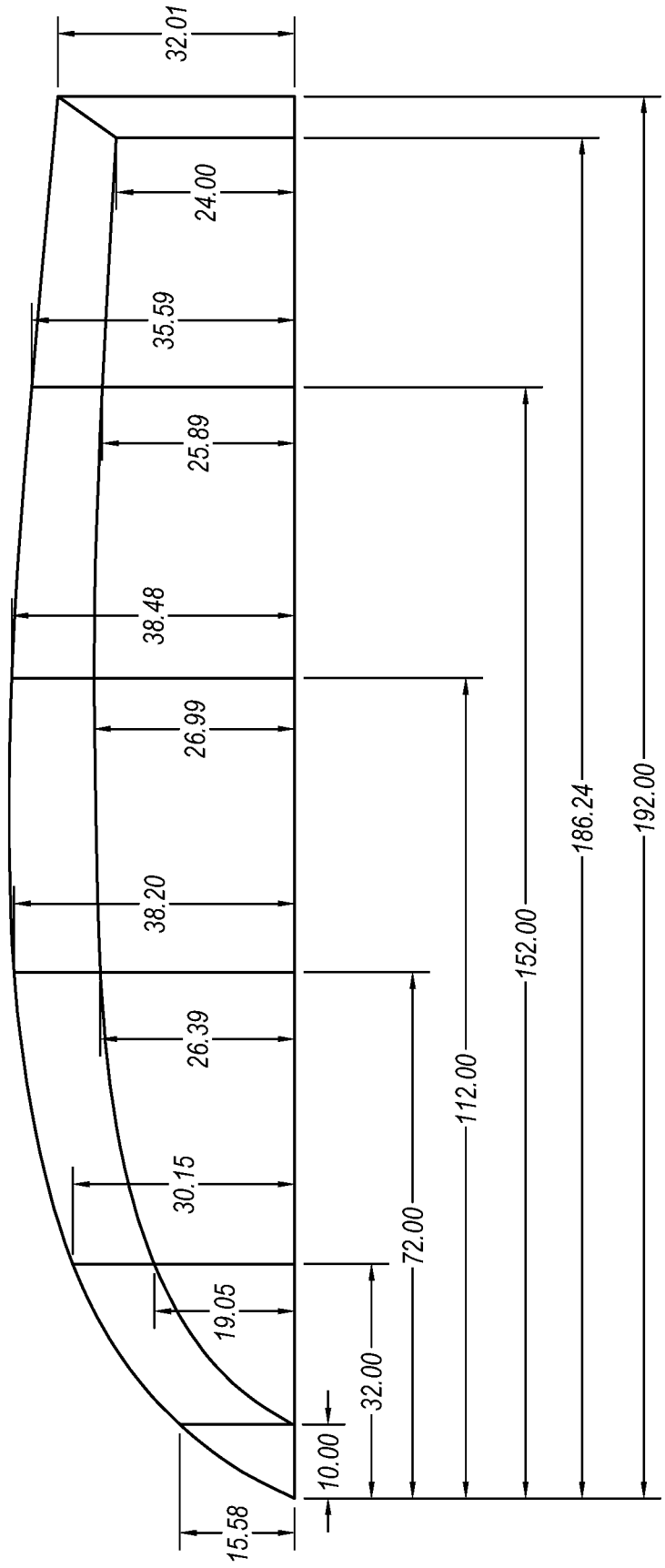
Figure 3A:
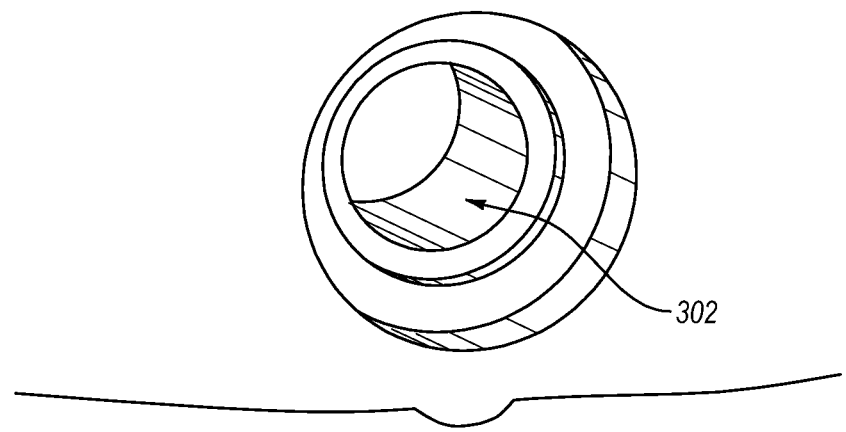
FIGS. 3A-3C illustrate various details regarding the drain of the boat of FIG. 1 including the use of a PTFE tube and aluminum fitting.
Figure 3B:
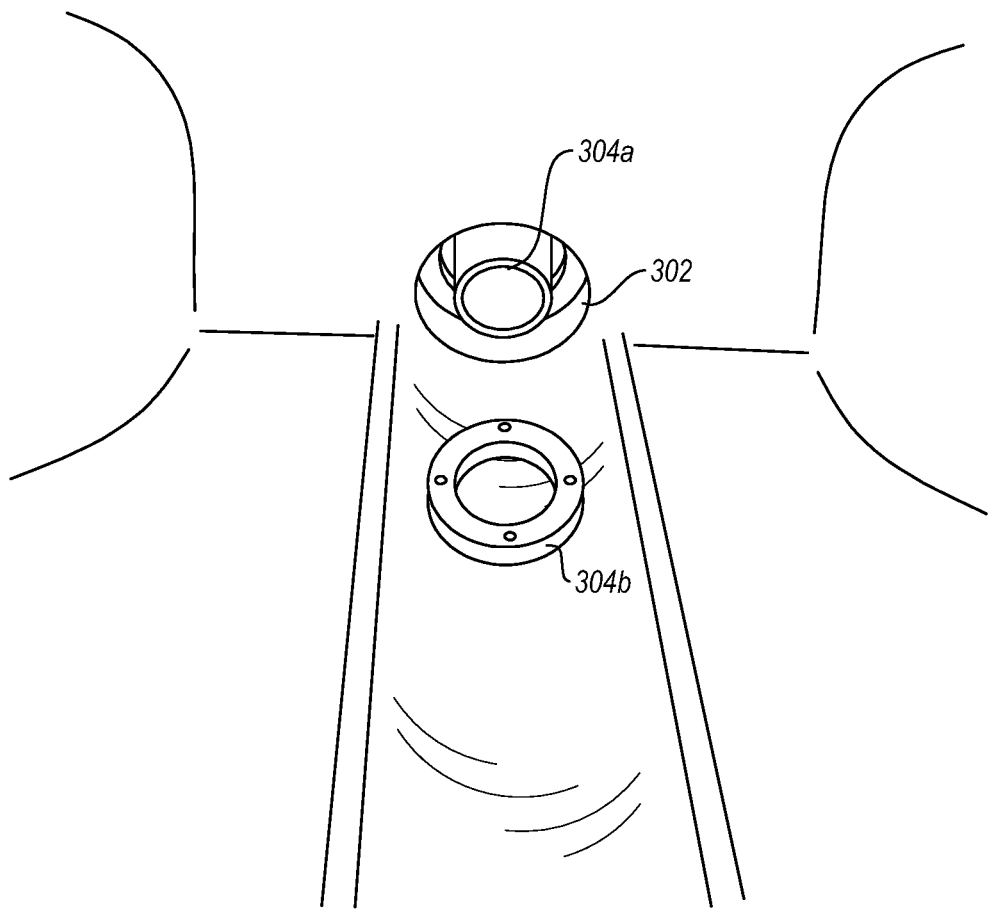
Figure 3C:
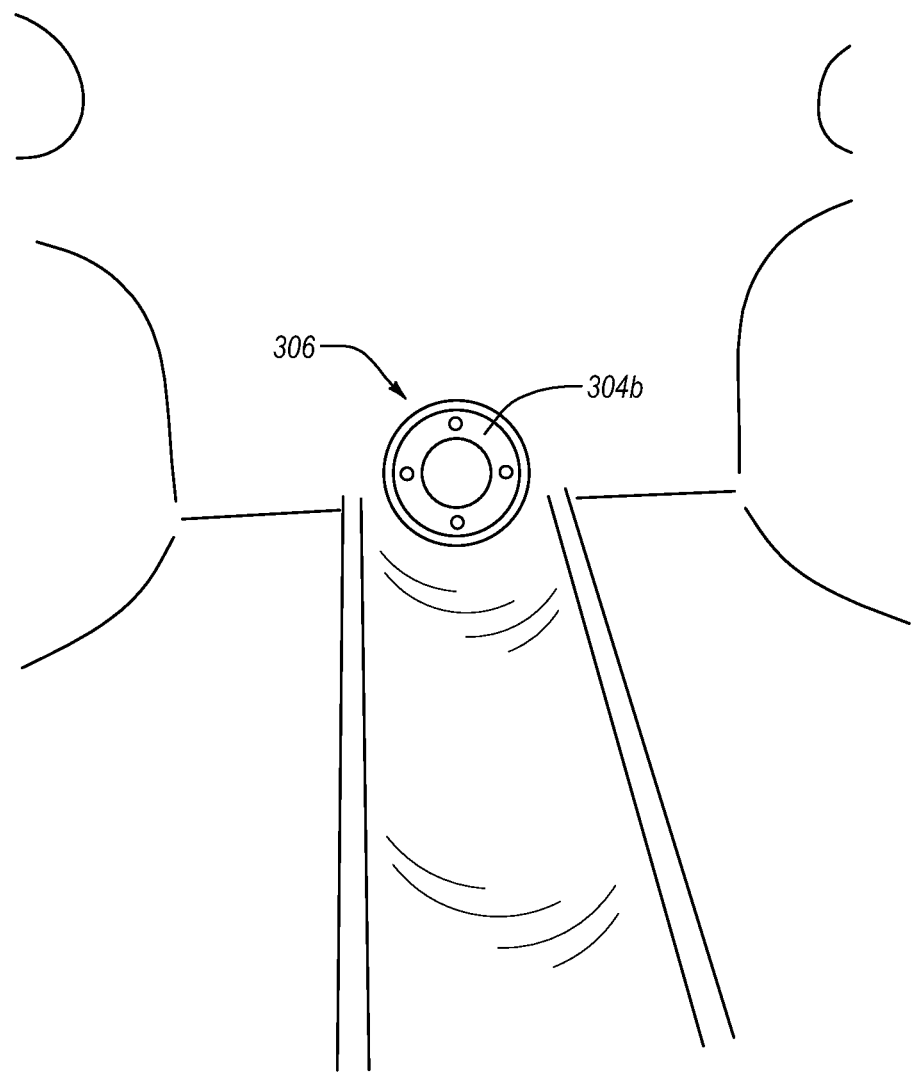
Figure 4A:
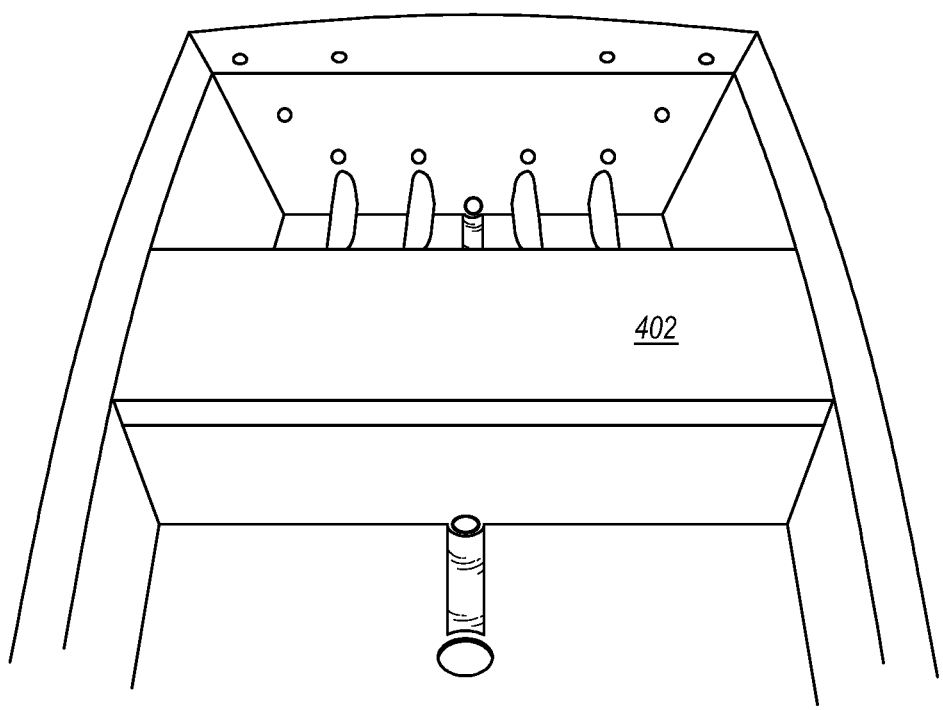
FIGS. 4A and 4B illustrate details of a bench of the boat of FIG. 1, including implementation of a drain through the bench.
Figure 4B:
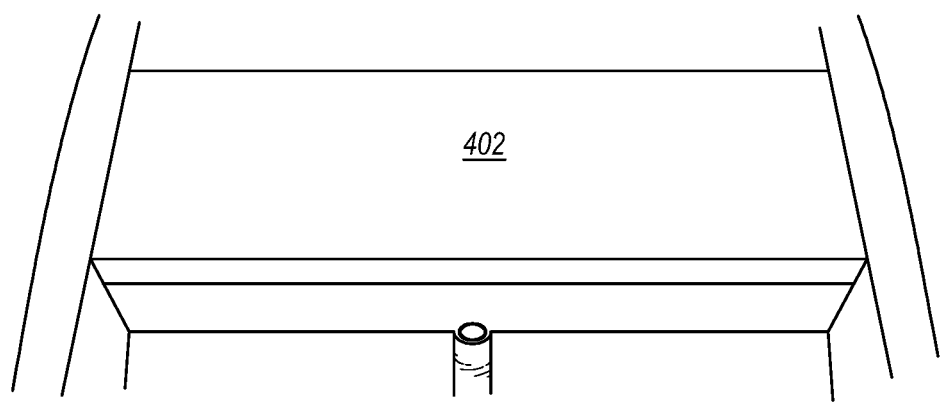

The following now illustrates an example of a process of providing drainage for a boat using the above principles. In particular, FIG. 1 illustrates a drain cavity 102 in a mold 104 to form a unique two part drain system for a 16 foot rotationally molded skiff designed by Hog Island Boat Works of Steamboat Springs Colo. Various details of the skiff are illustrated in FIGS. 2A, 2B, and 2C. The two part drain comprises a molded-in PTFE tube 302 (see FIGS. 3A and 3B) that acts as a guide and housing for a unique aluminum tube thru-hull fitting 304A and 304B (see FIGS. 3B and 3C) that is bolted together after molding the hull. This two part system ensures that there is no leakage or water penetration of the system into the body of the boat. A drain hole 400 (see FIG. 2A) is also formed through a bench 402 (see FIGS. 4A and 4B) in the boat, inasmuch as the bench is a solid bench that would ordinarily block water from moving from the front portion of the boat to the rear portion of the boat where the drain 306 (see FIG. 3C) is located. The drain hole formed in the bench of the boat allows water to flow to the rear of the boat where the outlet drain is located to allow water to be drained from inside the boat.

The location and length of the drains through the molded-in bench, and in the transom of the boat hull would not allow for drilling a hole after molding. Referring now to FIG. 1, FIG. 1 illustrates that a drain cavity 102 has been formed into the mold 104, and in effect mold in the drain cavity in the boat hull. The drain cavity is lined with a molded-in PTFE tube that acts as a guide for a more durable aluminum, stainless steel, or other material thru-hull drain.

The molded-in bench in the skiff is 22" wide. The PTFE tube that is molded-in to the hull under the bench is 19.8" long, and the aluminum tube is 20" long. The transom is 2½" wide. The PTFE tube used is 1.8" long, and the aluminum tube is 2" long. The PTFE used may have about a ¼" sidewall, and retains its shape enough for insertion and assembly of the aluminum drain.

Figure 5:
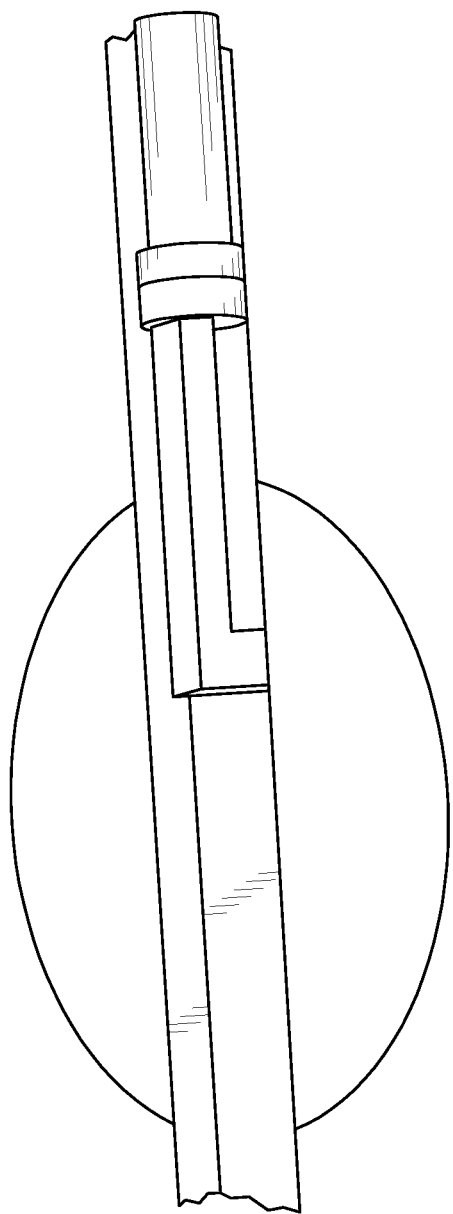
FIG. 5 illustrates a retention system for holding a PTFE tube during blow molding of the boat of FIG. 1.

Embodiments may be such that the boat hull mold includes a unique retention system that holds the PTFE pipe in place while the boat is molded in the rotational molding oven. An example of the retention system is illustrated in FIG. 5. This is unique in and of itself to mold tube this length in place while a mold is loaded with polyethylene resin, and is turning in the 500 degree oven.

The process for implementing a secure and functional drain in a boat hull, or other article of manufacture, involves molding in place a PTFE tube that is a pass-thru for a post molding assembled aluminum drain. This system was designed inasmuch as nothing exists in the rotational molding industry for a secure drain longer than 1". The drains that exist to date are 1" thru-wall fittings for water/storage tanks. The transom and drain would not work with this type drain, nor would any other rotationally molded boat hull, or other rotationally molded part that required a secure drain over 1".

The present invention may be embodied in other specific forms without departing from its spirit or characteristics.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A molded boat comprising:
   a molded hull having been molded using a first material to cause the boat to have a front portion and a rear portion; and
   a bench, having been molded together with the hull using the first material, wherein the bench extends from a starboard gunwale of the hull to a port gunwale of the hull, the bench having a front face and a rear face, the bench further comprising a bench seating surface between the front face and the rear face, the front face and the rear face being separated by a shape defined by a width of the bench seating surface, wherein the bench comprises a drain hole formed through the front face of the bench and the rear face of the bench, allowing water to flow from the front portion of the boat to the rear portion of the boat, wherein the drain hole formed through the bench is formed by using a tube molded into, and under the bench, the tube comprising a material having a higher melting point than the first material.

2. The molded boat of claim 1, wherein the tube comprises PTFE.

3. The molded boat of claim 1, further comprising a metal tube displaced through the tube molded into, and under the bench.

4. The molded boat of claim 1, further comprising a thru-hull drain formed through a back of the boat, the thru-hull drain comprising a thru-hull tube comprising a material having a higher melting point than the first material at the rear of the boat.

5. The molded boat of claim 4, wherein the thru-hull tube acts as a guide and housing for a metal thru-hull fitting that is bolted together after the hull is molded.

6. The molded boat of claim 1, wherein the drain hole formed through the bench connects a portion of a drain cavity in the front portion of the boat with a portion of the drain cavity in the rear portion of the boat.

7. The molded boat of claim 6, wherein the drain cavity is coupled to a thru-hull drain formed through a back of the boat.

8. A method of manufacturing a boat the method comprising:
   placing a tube in a mold for the boat, the tube being placed under a portion of the mold for a bench, wherein the bench extends from a starboard gunwale of the hull to a port gunwale of the hull, the bench having a front face and a rear face, the bench further comprising a bench seating surface between the front face and the rear face, the front face and the rear face being separated by a shape defined by a width of the bench seating surface, the tube being formed of a first material;
   with the tube in the mold, molding the boat, using a second material, the first material having a higher melting point than the second material, to cause the boat to have a front portion and a rear portion and to cause the bench to be molded together with the hull using the second material, such that the bench comprises a drain hole formed through the bench, by virtue of the tube, allowing water to flow from the front portion of the boat to the rear portion of the boat.

9. The method of claim 8, wherein the tube comprises PTFE.

10. The method of claim 8, further comprising placing a metal tube through the tube.

11. The method of claim 8, further comprising placing a thru-hull tube in the mold prior to molding, such that molding causes a thru-hull drain to be formed through a back of the boat, the thru-hull tube comprising a material having a higher melting point than the second material at the rear of the boat.

12. The method of claim 11, further comprising placing a metal thru-hull fitting through the thru-hull tube and bolting the metal thru-hull fitting together after the hull is molded.

13. The method of claim 8, wherein the method is performed such that the drain hole formed through the bench connects a portion of a drain cavity in the front portion of the boat with a portion of the drain cavity in the rear portion of the boat.

14. The method of claim 13, wherein the method is performed to cause the drain cavity to be coupled to a thru-hull drain formed through a back of the boat.

15. A molded boat, comprising:
a molded hull having been molded using a first material to cause the boat to have a front portion and a rear portion;
a bench, having been molded together with the hull using the first material, wherein the bench comprises a drain hole formed through a face of the bench allowing water to flow from the front portion of the boat to the rear portion of the boat, wherein the drain hole formed through the bench is formed by using a tube molded into, and under the bench, the tube comprising a material having a higher melting point than the first material; and
a thru-hull drain formed through a back of the boat, the thru-hull drain comprising a thru-hull tube comprising a material having a higher melting point than the first material at the rear of the boat, wherein the thru-hull tube acts as a guide and housing for a metal thru-hull fitting that is bolted together after the hull is molded.

16. The molded boat of claim 15, wherein the tube comprises PTFE.

17. The molded boat of claim 15, further comprising a metal tube displaced through the tube molded into, and under the bench.

18. The molded boat of claim 15, wherein the drain hole formed through the bench connects a portion of a drain cavity in the front portion of the boat with a portion of the drain cavity in the rear portion of the boat.

19. The molded boat of claim 18, wherein the drain cavity is coupled to the thru-hull drain.

\* \* \* \* \*